April 14, 1964     G. E. SANNER     3,129,425
THREE BEAM MONOPULSE RADAR SYSTEM AND APPARATUS
Filed Sept. 27, 1957     2 Sheets-Sheet 1
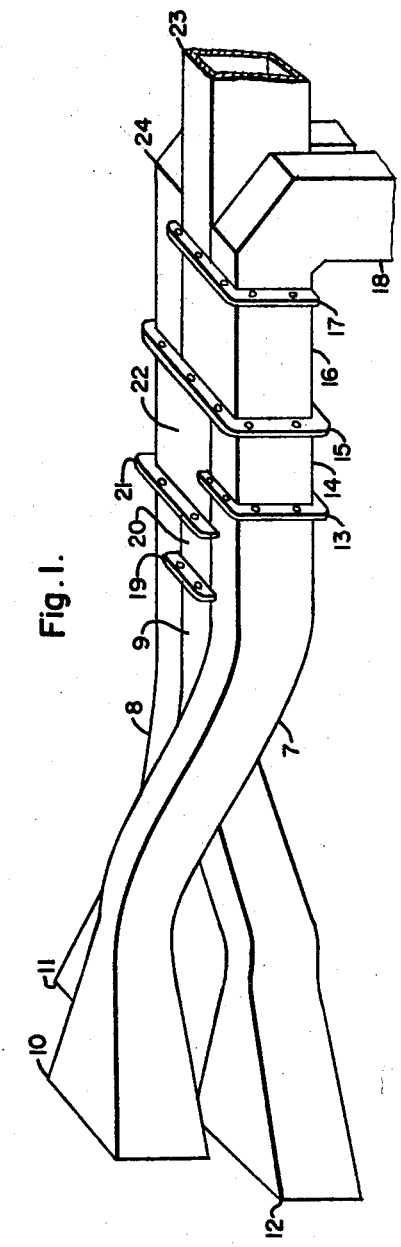
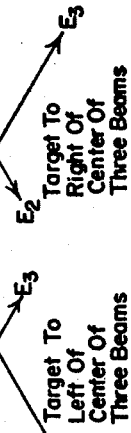
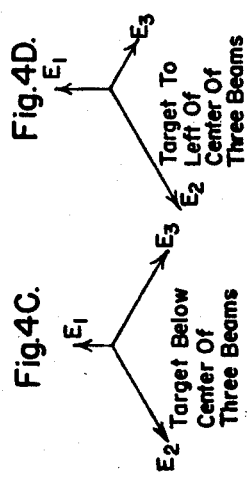
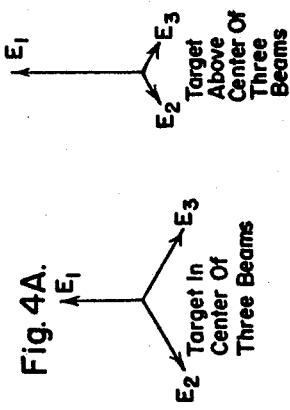

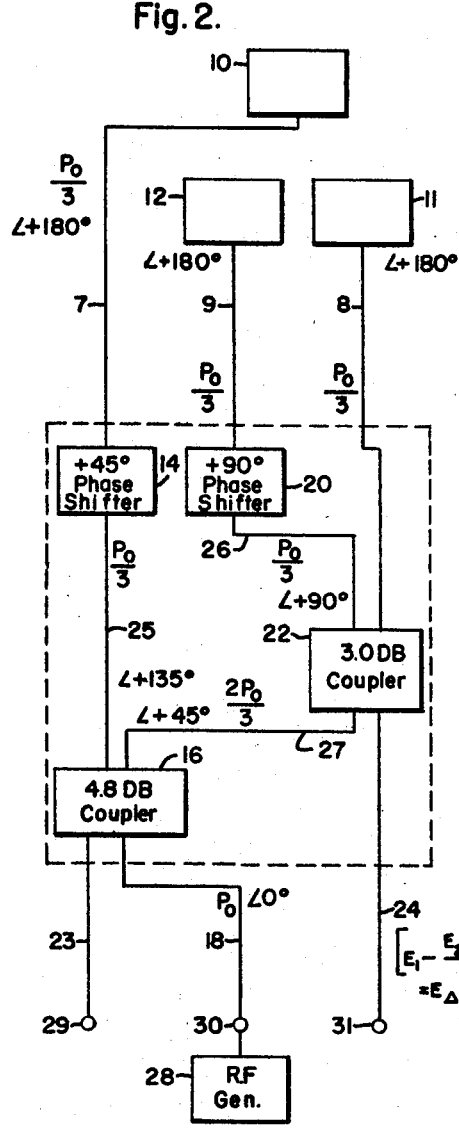
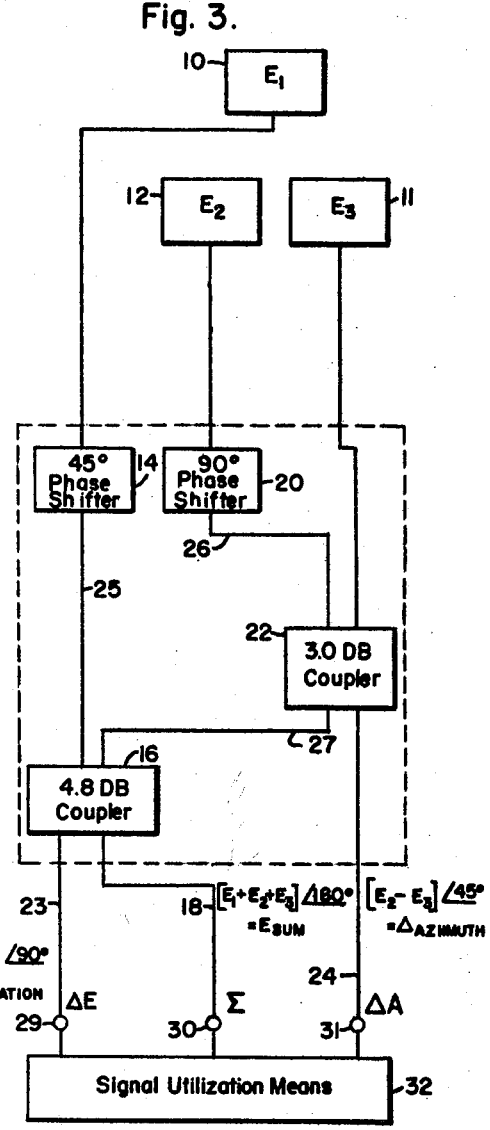

United States Patent Office 3,129,425
Patented Apr. 14, 1964

3,129,425
THREE BEAM MONOPULSE RADAR SYSTEM AND APPARATUS
George E. Sanner, Baltimore, Md., assignor to Westinghouse Electric Corporation, East Pittsburgh, Pa., a corporation of Pennsylvania
Filed Sept. 27, 1957, Ser. No. 687,599
9 Claims. (Cl. 343—16)

This invention relates to radar systems and more particularly to simultaneous lobing radar systems.

As is well known in the radar art, a simultaneous lobing radar system procures all required information on each pulse, rather than through a complete nutation cycle, and such systems are frequently referred to as monopulse systems.

One prior art amplitude monopulse system consists of four feed horns centered in front of a reflector in such a manner as to provide four similar secondary patterns which are all in phase. The outputs of these horns are then combined in a radio-frequency comparator in such a manner as to produce range, azimuth and elevation error signals at radio-frequency. These signals are detected and used to drive the antenna in a manner to keep it centered on the target.

One of the primary objections to the prior art monopulse system described above however, has been the extreme complexity of the radio-frequency waveguides or "plumbing" required to provide precise error signals. The four feed horns consume considerable space in front of the reflector, and since the system is extremely phase sensitive, it is desirable to place the radio-frequency comparator as close to the feed horns as possible. This factor, coupled with the fact that the comparator is extremely bulky, results in possible distortion of the antenna primary pattern.

The apparatus of this invention overcomes these and other disadvantages of the prior art simultaneous lobing monopulse systems and at the same time provides a very simple radio-frequency "plumbing" system which is small and compact. This is accomplished by means of a three beam system. Theoretically, in accordance with principles of elementary geometry, an unknown point to be located in space by means of measuring distances and angles can be successfully located by three observation points, and only three are required. Three feed horns are all that are required to locate and track a radar target by means of a monopulse system.

The elimination of the fourth feed horn results in the elimination of one feed line and reduction of the radio-frequency comparator components by substantially 50 percent. Furthermore, there is no unused channel output from the radio-frequency comparator, as in the case of the four beam monopulse system; hence, the need for a radio-frequency load to terminate an unused channel is removed.

The advantages of a three beam amplitude comparison type monopulse system over a four beam system may be summarized as follows: The three beam system requires only three feed horns and three tranmission lines. The three beam system requires a very simple radio-frequency comparator utilizing only one short slot coupler and one short slot hybrid junction. Every output of the comparator is used, and hence, no special termination is required. The three beam monopulse system requires a 45° phase shifter in place of the usual 90° phase shifter required in a four beam system. This is important since phase shifters with good bandwidth qualities are difficult to construct in small sizes. The comparator of the three beam amplitude system is extremely compact in mechanical size; this results in less distortion in the primary antenna beam pattern.

The three beam monopulse radar system may find application in ground-to-air and air-to-air missile guidance, in ground installation fire control, in shipboard and aircraft fire control, and in aircraft landing systems. It is especially suited for fire control systems to be mounted on aircraft because of its simplicity.

Accordingly, a primary objective of this invention is to provide a new and improved monopulse radar system and apparatus of the amplitude type.

Another objective is to provide a new and improved amplitude monopulse radar system employing only three beams.

A further objective is to provide a new and improved radar system and apparatus which utilizes an RF comparator of extreme simplicity and minimized physical size.

A still further objective is to provide a new and improved monopulse radar system, and apparatus, which is characterized by enhanced system performance since the RF comparator can be placed close to the RF feed horns with little primary beam pattern occlusion, thereby reducing phase cancellation errors due to long transmission line lengths.

Other objects and advantages will become apparent after a perusal of the following specification when read in connection with the accompanying drawings, wherein:

FIGURE 1 is a perspective view of the electro-magnetic radiators, or three horn antennas, and the associated RF comparator consisting of phase shifters, couplers and wave guides;

FIG. 2 is a schematic electrical circuit diagram, in block form, of the three beam amplitude monopulse radar system during the pulse transmission period of operation;

FIG. 3 is a schematic electrical circuit diagram, in block form, of the three beam amplitude monopulse radar apparatus during the receiving operation; and FIGS. 4A, 4B, 4C, 4D and 4E are vector diagrams illustrating the operation of the apparatus of FIG. 1.

Particular reference should be made now to the drawings, in which like reference numerals are used throughout to designate like parts, for a more complete understanding of the invention, and in particular to FIG. 1 thereof. The reference numerals 10, 11 and 12 designate three electromagnetic radiators which may be horn-type radar antennas for example, disposed in predetermined positions with respect to each other, and substantially as shown in the drawing. Radiator or horn antenna 10 has feed or waveguide portion 7 thereof coupled at 13 to a 45° phase shifter 14 hereinafter to be more fully described, and the 45° phase shifter 14 is coupled at 15 to a 4.8 db coupler 16 hereinafter to be more fully described. The coupler 16 is coupled at 17 to a waveguide 18 which provides the signal representing the sum of the returned signals.

The aforementioned radiator or horn antenna 12 has feed or waveguide portion 9 thereof coupled at 19 to a 90° phase shifter 20 and the phase shifter 20 is coupled at 21 to a 3.0 db coupler 22, the coupler 22 being coupled at 15 to the aforementioned 4.8 db coupler 16, the coupler 16 being also coupled at 17 to a waveguide section 23 which carries the error signal of the elevation channel, in a manner which will become hereinafter more clearly apparent. The couplers 16 and 22 as well as the phase shifters 14 and 20 comprise a radio-frequency comparator.

The aforementioned radiator or horn antenna 11 has the feed or waveguide portion 8 thereof coupled at 21 to the aforementioned 3.0 db coupler 22 which is further coupled at 15 to a waveguide section 24 which carries the error signal of the azimuth channel, in a manner which will become hereinafter more clearly apparent.

Particular reference should be made now to FIG. 2, which is a block diagram of the apparatus, and shows the flow of radio-frequency energy therethrough during the transmission of a radar pulse. The waveguide sections 23, 18 and 24 are seen in FIG. 2 to have terminals 29, 30 and 31, respectively, the terminals 29 and 31 being open during the transmission operation. Connected to terminal 30 is a suitable source of pulsed radio-frequency energy shown in block form and designated as 28, of a suitable radio-frequency and of any convenient magnitude, such for example, as one megawatt. For purposes of explanation, the radio-frequency power in guide 18 will be normalized to zero degrees phase shift with respect to the generated power and the power in 18 will represent the total generated power and will be referred to as $P_0$. This radio-frequency power is applied to an aforementioned 4.8 decibel coupler 16 herein shown in block form, where power division occurs and one-third of the transmitted power $$\frac{P_0}{3}$$

is conducted by a path or conducting means 25 to the 45° phase shifter 14. Whereas for convenience of illustration, in the block diagram of FIG. 2 the reference numeral 25 indicates a path from coupler 16 to phase shifter 14, it will be recalled that coupler 16 and phase shifter 14 are shown directly connected at 15 in FIG. 1. The portion of the power coming out of the 4.8 db coupler 16 by path 25 having been shifted in phase 135°, an additional 45° phase shift added by phase shifter 14 results in the power reaching horn 10 by waveguide portion 7 being advanced in phase 180° from the power at generator 28, and the portion of the power at horn 10 is one-third of the generated power applied to terminal 20, or $$\frac{P_0}{3}$$

The remaining portion of the power passed by the 4.8 db coupler 16 to path 27 is advanced in phase 45° from the power applied to the coupler 16 and the power in path or conducting means 27 represents $$\frac{2P_0}{3}$$

This power is supplied to an additional 3 db coupler, which may be a short slot hybrid junction shown in block form and designated 22, where the power to be transmitted is divided between path or conducting means 26 and waveguide portion 8. The power in conducting means or path 26 is now advanced in phase 90° from the power at generator 28, and the amount of power corresponds to $$\frac{P_0}{3}$$

This power in conducting means 26 is shifted an additional 90° by phase shifter 20, being advanced in phase 90°, with the result that the power in the waveguide section 9 connected to radiator or horn antenna 12 is advanced in phase 180° from the power of generator 28, and the amount of power applied to radiator or horn 12 is one-third of the power generated at 28. Whereas, for convenience of illustration, in the block diagram of FIG. 2 the reference numeral 27 indicates an energy path from coupler 16 to coupler 22, it will be recalled that 16 and 22 are directly connected at 15 in FIG. 1. Likewise, coupler 22 and 90° phase shifter 20 are directly connected at 21 in FIG. 1, the path between 22 and 20 being indicated at 26 in FIG. 2.

As aforementioned, the power in conducting means or path 27, FIG. 2, is divided at coupler 22, and the portion of the power in waveguide section 8 connected to radiator or horn antenna 11 represents $$\frac{P_0}{3}$$

An inherent characteristic of the 3 db coupler 22 is that an additional phase shift of +135° is given to the energy in waveguide portion 8. When this phase shift is added to the 45° phase shift produced by coupler 16, the radio-frequency energy in waveguide portion 8 conducted to horn antenna 11 is advanced in phase 180° with respect to the phase of the energy generated at 28.

Assuming, as aforementioned, that the power generated at 28 is of the order of 1 megawatt, then the power radiated from each of the horn antennas 10, 11 and 12 is of the order of .33 megawatt. Furthermore, the three beams from the antennas 10, 11 and 12 are in phase, equal phase shifts of +180° having occurred in all three channels.

Particular reference should be made now to FIG. 3 which illustrates the three beam amplitude monopulse radar apparatus and system, of this invention, during the receiving period thereof, and charts the path of the three signals (obtained from the radar echo) through the invention to the apparatus shown in block form at 32. Here, the various outputs are utilized, for example, to track the target and provide range information. The three radiator or horn antennas 10, 11 and 12 have signals or voltages therein represented in magnitude by the voltages $E_1$, $E_3$ and $E_2$, respectively.

The conditions for satisfactory operation during the receive period are shown in FIGS. 4A–4E, to which particular reference is now made. The signal utilization means 32 connected to the terminals 29, 30 and 31 during the receive period while the system is locked on the target provides zero error signals as shown by curve 4A, which illustrates the conditions when the target is in the center of the three beams. In this case, as shown, the three feed horn outputs $E_1$, $E_2$ and $E_3$ from radiators or horns 10, 12 and 11 respectively, are all equal. While the target is high or above center as illustrated by the graph of FIG. 4B, $E_1$ is greater than $E_2$ or $E_3$. While the target is high above center, however, $E_2$ equals $E_3$. While the target is below center, $E_2$ equals $E_3$, but both are greater than $E_1$ as illustrated by the graph of FIG. 4C. While the target is left of center, $E_2$ will be greater in magnitude than $E_1$ or $E_3$ as illustrated by the graph of FIG. 4D, and while the target is right of center, $E_3$ exceeds in value both $E_1$ and $E_2$, as illustrated by FIG. 4E. The vector values of signals $E_1$, $E_2$ and $E_3$ accordingly, always locate the target accurately in space with respect to the radiation axis of the horn assembly. The condition for zero elevation and zero azimuth error signals are described by the following equations:

$$\Sigma_{sum} = E_1 + E_2 + E_3$$

$$E_{\Delta \ elev.} = E_1 - \left[ \frac{E_2 + E_3}{2} \right]$$

$$E_{\Delta \ azim.} = (E_1 + E_2) - (E_1 + E_3) = E_2 - E_3$$

It will be noted, then, that the sum signal (which provides a range or range error signal) and elevation and azimuth direction sensing signals, should preferably be without loss. The elevation error signal is the difference between $E_1$ and one-half of the sum of $E_2$ and $E_3$. This provides for zero elevation error when the target is on center. The azimuth error signal is the difference between the sum of $E_1$ and $E_2$ and the sum of $E_1$ and $E_3$ or $E_2-E_3$. The necessary mathematical operations on the received signals are performed by couplers 16 and 22.

The manner in which the apparatus and the radio-frequency comparator provide and accomplish these conditions during the receiving mode of operation, is shown in detail in FIG. 3. We shall assume for the purposes of explanation that the antenna assembly is on-target with equal signal returns to each antenna. Energy $E_1$ in horn 10 passes through the 45° phase shifter 14 and arrives in the 4.8 db coupler 16 with a total phase shift of 45°. Energy $E_2$ in horn 12 passes through the 90° phase shifter 20 and arrives in the 3 db hybrid coupler 22 with a total shift of 90°. The energy represented by $E_3$ in horn 11 arrives in the same hybrid junction or hybrid coupler 22 with a phase shift of 0°. In the azimuth channel output arm of the 3 db coupler 22, $E_2$ and $E_3$ are subtracted as shown. It should be noted that the total amplitude summation is zero and hence the azimuth error tracking requirement aforedescribed is fulfilled. In the other output arm of the 3.0 db hybrid coupler 22, $E_2$ and $E_3$ are summed into the 4.8 db coupler 16, where they are again summed with $E_1$ to provide in waveguide 18 signal equal to $E_1+E_2+E_3$. In the elevation channel output arm 23 of the 4.8 db coupler 16, $E_1$ and one-half the sum of $E_2$ and $E_3$ are subtracted as shown. It should be noted that the requirement for elevation error has been fulfilled. As aforementioned, the other output 18 of the 4.8 db coupler 16 sums $E_1$, $E_2$ and $E_3$. In this channel, the amplitude indicates no loss from the total energy. Thus, the summing channel fulfills all requirements for monopulse summing.

The mathematical operations are made intrinsic in the construction and arrangement of the couplers 16 and 22.

It should be noted that all the channels are used to fulfill all required conditions.

Whereas the invention has been shown and described with respect to hybrid junctions, it should be understood that magic T couplings, hybrid rings, or transvar junctions could be employed if desired.

Although the aforementioned hardware arrangement, as described, comprises horns, waveguide couplers, and waveguide type phase shifters, it is to be understood that apparatus embodying this invention could as well be fabricated from printed components such as microstrip printed waveguide, printed directional couplers and printed phase shifters.

There has been shown and described then, an apparatus and system which admirably fulfills the aforedescribed objects of the invention.

The word "radiators" as used in the claims appended hereto includes means for receiving as well as transmitting radiant energy.

Whereas the invention has been shown and described with reference to a preferred embodiment thereof which gives satisfactory results, it should be understood that changes may be made and equivalents substituted without departing from the spirit and scope of the invention.

I claim as my invention:

1. Monopulse radar apparatus comprising, in combination, first, second, and third radiators disposed in predetermined positions with respect to each other about a predetermined radiation axis, means for generating radio frequency energy of a frequency suitable for transmission by the three radiators, connecting means including power dividing means operatively connecting said generating means to all said three radiators, the three radiators and connecting means being constructed and arranged whereby there are simultaneously transmitted three mutually overlapping in-phase beams of radiant energy of the same radio frequency, of substantially equal power and substantially similar patterns about said radiation axis, and receiving means including said three radiators and power dividing means and including means for comparing the energy received by the three radiators resulting from reflection from a target in all three of the transmitted beams, said three radiators and receiving means being constructed and arranged whereby the energy received by the first radiator is compared with one-half the sum of the energies received by the second and third radiators to provide information about the location of the target in one plane, and the energy received by the second radiator is compared with the energy received by the third radiator to provide information about the location of the target in another plane substantially perpendicular to the first-named plane, the radiation axis lying in both said planes.

2. Monopulse radar apparatus comprising, in combination, first, second, and third radiators disposed in predetermined positions with respect to each other about a predetermined radiation axis, means for generating pulses of radio frequency energy of a frequency suitable for transmission by the three radiators, connecting means including power dividing means and phase shifting means operatively connecting said generating means to all said three radiators, the three radiators and connecting means being constructed and arranged whereby there are simultaneously transmitted three mutually overlapping in-phase beams of radiant energy of the same radio frequency, of substantially equal power and substantially similar patterns about said radiation axis, and signal utilization means connected to the connecting means during at least portions of the intervals between transmitted pulses, said connecting means and signal utilization means being constructed and arranged for comparing the energy received by the three radiators resulting from reflection from a target in all three of the transmitted beams to thereby provide information about the location of the target in a pair of mutually perpendicular planes with respect to said radiation axis, the energy received by the first radiator being compared with one-half the sum of the energies received by the second and third radiators to provide information about the location of the target in one plane of said pair, and the energy received by the second radiator being compared with the energy received by the third radiator to provide information about the location of the target in the other plane of said pair.

3. Monopulse radar apparatus comprising, in combination, three movable radiators disposed substantially equidistant from each other in a triangular pattern and about a predetermined radiation axis, the line between two of the radiators being substantially horizontal, means for generating pulses of radio frequency energy of a frequency suitable for transmission by said radiators, connecting means including power dividing means operatively connecting said generating means to all said three radiators, said three radiators and connecting means being constructed and arranged whereby there are simultaneously transmitted three mutually overlapping in-phase beams of radiant energy of the same radio frequency, of substantially equal power and substantially similar patterns about said radiation axis, and echo signal utilization and tracking signal generating means connected to the connecting means during at least portions of the intervals between transmitted pulses, said connecting means and echo signal utilization and tracking signal generating means being constructed and arranged for comparing the energy received by the three radiators resulting from reflection from a target in all three of the transmitted beams in accordance with the location of the target in a pair of mutually perpendicular planes with respect to said radiation axis and to generate azimuth and elevation tracking error signals suitable for use to move all three of said radiators together in a manner which tends to locate said target on said radiation axis, the azimuth error signal being obtained by comparing the energy received by one of the two horizontally related radiators with the energy received by the other horizontally related radiator, the elevation error signal being obtained by comparing one-half the sum of the energies received by the two radiators which are horizontally disposed with respect to each other with the energy received by the third of the three radiators.

4. Monopulse radar apparatus comprising, in combination, three radiators disposed substantially equidistant from each other in a triangular pattern and about a preselected radiation axis, means for generating pulses of radio frequency energy of a frequency suitable for transmission by said radiators, connecting means including first and second power dividing means, said first power dividing means being operatively connected to said generating means to receive the output therefrom, said first power dividing means being operatively connected to one of said radiators and delivering a one-third portion of the generated power thereto, said first power dividing means being operatively connected to said second power dividing means and delivering the remaining two-thirds of the generated power to the second power dividing means, said second power dividing means being operatively connected to the other two of said three radiators and delivering substantially half the power received thereby to each of said other two radiators, said three radiators and connecting means being constructed and arranged whereby there are transmitted three mutually overlapping in-phase beams of radiant energy of substantially equal power and substantially similar patterns about said predetermined radiation axis, and signal utilization means connected to the connecting means during at least portions of the intervals between transmitted pulses, said connecting means and signal utilization means being constructed and arranged for comparing the energy received by the three radiators resulting from reflection from a target in all three of the transmitted beams to thereby provide information about the location of the target in a pair of mutually perpendicular planes with respect to said radiation axis.

5. Monopulse radar apparatus comprising, in combination, three movable radiators disposed substantially equidistant from each other in a triangular pattern and about a predetermined radiation axis, means for generating pulses of radio frequency energy of a frequency suitable for transmission by said radiators, connecting means including first and second power dividing means, said first power dividing means being operatively connected to said generating means to receive the output therefrom, said first power dividing means being operatively connected to one of said radiators and delivering a one-third portion of the generated power thereto, said first power dividing means being operatively connected to said second power dividing means and delivering the remaining two-thirds of the generated power to the second power dividing means, said second power dividing means being operatively connected to the other two of said three radiators and delivering substantially half the power received thereby to each of said other two radiators, said three radiators and connecting means being constructed and arranged whereby there are transmitted three mutually overlapping in-phase beams of radiant energy of substantially equal power and substantially similar patterns about said predetermined radiation axis, and echo signal utilization and tracking signal generating means connected to the connecting means during at least portions of the intervals between transmitted pulses, said connecting means and echo signal utilization and tracking signal generating means being constructed and arranged for comparing the energy received by the three radiators resulting from reflection from a target in all three of the transmitted beams in accordance with the location of the target in a pair of mutually perpendicular planes and with respect to said radiation axis and to generate tracking error signals suitable for use to move all three of said radiators together in a manner which tends to locate said target on said radiation axis.

6. In monopulse radar apparatus, in combination, three radiators disposed substantially equidistant from each other in a triangular pattern and about a preselected radiation axis, means for generating pulses of radio frequency energy of a frequency suitable for transmission by said three radiators, and connecting means including first and second power dividing means, said first power dividing means being operatively connected to said generating means to receive the output therefrom, said first power dividing means being operatively connected to one of the radiators and delivering a one-third portion of the generated power thereto, said first power dividing means being operatively connected to said second power dividing means and delivering the remaining two-thirds of the generated power to the second power dividing means, said second power dividing means being operatively connected to the other two of the three radiators and delivering substantially one-half the power received thereby to each of said other two radiators, said three radiators and connecting means being constructed and arranged whereby there are transmitted three mutually overlapping in-phase beams of radiant energy of substantially equal power and substantially similar patterns about said predetermined radiation axis.

7. In monopulse radar apparatus, in combination, three radiators disposed substantially equidistant from each other in a triangular pattern and about a preselected radiation axis, means for generating pulses of radio frequency energy of a frequency suitable for transmission by said three radiators, first and second power dividing means, the first power dividing means being operatively connected to said generating means to receive the output therefrom, first and second connecting means connected to the first power dividing means to receive the output therefrom, the first power dividing means delivering one-third of the power received thereby to the first connecting means with the phase thereof shifted 135 degrees, 45 degree phase shifter means connected to the first connecting means, third connecting means connecting the 45° phase shifter means to one of said radiators for delivering a one-third portion of the total generated power thereto shifted in-phase a total of substantially 180 degress, the first power dividing means delivering two-thirds of the power received thereby to the second connecting means with the phase thereof shifted 45 degrees, the second power dividing means being connected to said second connecting means, fourth and fifth connecting means connected to the second power dividing means to receive the output therefrom, the second power dividing means delivering one-half of the power received thereby to the fourth connecting means with the phase shifted an additional 45 degrees, 90 degree phase shifter means connected to the fourth connecting means, and sixth connecting means connecting the output of the 90 degree phase shifter means to a second radiator of the three radiators for delivering a one-third portion of the total generated power thereto shifted in phase a total of substantially 180 degrees, the second power dividing means delivering one-half of the power received thereby to the fifth connecting means shifted in phase an additional 135 degrees, the fifth connecting means being connected to the third radiator of the three radiators for delivering a one-third portion of the total generated power thereto shifted in phase a total of substantially 180 degrees, all said three radiators, connecting means, power dividing means and phase shifter means providing an arrangement whereby there are transmitted three mutually overlapping in-phase beams of radiant energy of substantially equal power and substantially similar patterns about said predetermined radiation axis.

8. In radar apparatus, in combination, first, second, and third similar radiators disposed substantially equidistant from each other in a triangular pattern and symmetrically about a preselected axis for receiving energy from a target, the patterns of response of the three radiators overlapping, signal utilization means, coupling means including first and second power dividing means operatively connecting the signal utilization means to the three radiators, the three radiators and coupling means being constructed and arranged whereby the energy received by the first radiator is compared with one-half the sum of the energies received by the second and third radiators to provide the signal utilization means information about the location of the target in one plane, and the energy received by the second radiator is compared with the energy received by the third radiator to provide the signal utilization means information about the location of the target in another plane substantially perpendicular to the first-named plane.

9. In radar apparatus, in combination, first, second and third similar radiators disposed in predetermined positions with respect to each other symmetrically about a predetermined axis for receiving energy from a target, the first, second and third radiators having overlapping patterns of response, signal utilization means, first power dividing means adapted to have two inputs applied thereto and to provide two outputs applied as two inputs to the signal utilization means, means including first phase shifter means connecting the first radiator to said first power dividing means to provide an input thereto, second power dividing means adapted to have two inputs applied thereto and to provide two outputs, means connecting one of the outputs of the second power dividing means as an input to the first power dividing means, second phase shifter means connecting the second radiator to provide an input to the second power dividing means, means connecting the third radiator to provide an input to the second power dividing means, and means connecting the other output of the second power dividing means to provide an additional third input to the signal utilization means, the first and second phase shifter means and first and second power dividing means providing two signals to the signal utilization means for providing information about the location of the target source of energy in two mutually perpendicular planes and providing a third signal to the signal utilization means representing the sum of the energies received by the first, second and third radiators, the outputs of the first, second and third radiators being all in-phase with each other in said third signal in accordance with phase shifts in the first and second phase shifter means and first and second power dividing means to provide a summed signal suitable for use in target ranging.

References Cited in the file of this patent

UNITED STATES PATENTS

| | | |
|---|---|---|
| 2,426,183 | Deloraine et al. | Aug. 26, 1947 |
| 2,830,288 | Dicke | Apr. 8, 1958 |
| 2,925,595 | Thourel | Feb. 16, 1960 |